(12) United States Patent
Herbst

(10) Patent No.: US 10,324,442 B2
(45) Date of Patent: Jun. 18, 2019

(54) ITERATIVE METHOD AND PRODUCTION CONTROL UNIT FOR CONTROLLING PRODUCTION PROCESS

(75) Inventor: Harald Herbst, Linz (AT)

(73) Assignee: BOREALIS AG, Vienna (AT)

( * ) Notice: Subject to any disclaimer, the term of this patent is extended or adjusted under 35 U.S.C. 154(b) by 858 days.

(21) Appl. No.: 13/806,440

(22) PCT Filed: Jun. 21, 2011

(86) PCT No.: PCT/EP2011/060365
§ 371 (c)(1),
(2), (4) Date: May 30, 2013

(87) PCT Pub. No.: WO2011/161112
PCT Pub. Date: Dec. 29, 2011

(65) Prior Publication Data
US 2013/0245807 A1    Sep. 19, 2013

(30) Foreign Application Priority Data

Jun. 24, 2010 (EP) .................................... 10167172

(51) Int. Cl.
*G05B 19/18* (2006.01)
*G05B 13/02* (2006.01)
(Continued)

(52) U.S. Cl.
CPC ........... *G05B 19/18* (2013.01); *G05B 13/024* (2013.01); *G05B 15/02* (2013.01); *G05B 17/02* (2013.01)

(58) Field of Classification Search
CPC .... G05B 13/024; G05B 13/027; G05B 19/18; G05B 15/02; G05B 17/02; Y02P 80/40
See application file for complete search history.

(56) References Cited

U.S. PATENT DOCUMENTS

| 5,723,517 A | * | 3/1998 | Campo ............... B01F 13/1055 137/93 |
| 2002/0055806 A1 | * | 5/2002 | Brown ................ B29C 45/7686 700/197 |

(Continued)

FOREIGN PATENT DOCUMENTS

| CN | 13802081 A | 11/2002 |
| CN | 1520557 A | 8/2004 |

(Continued)

OTHER PUBLICATIONS

Canadian Examiner's Report dated Apr. 30, 2015.
Korean Office Action dated May 19, 2014.
Chinese Office Action dated Nov. 4, 2014.

*Primary Examiner* — Robert E Fennema
*Assistant Examiner* — Shon G Foley
(74) *Attorney, Agent, or Firm* — Tarolli, Sundheim, Covell & Tummino LLP

(57) ABSTRACT

An iterative method for controlling a production process and a production control unit for iteratively controlling the production process of at least one of a material and a product formed out of the compound material. Nominal parameters and indicative parameters selected from the group comprising process parameters, material recipe parameters and product property parameters are provided in the iterative method or to the production control unit. The iterative method and production control unit consider the nominal and indicative parameters, including both process parameters and material recipe parameters to determine whether a setting of at least one correcting parameter for a subsequent process is necessary. A correcting parameter is selected from the group comprising process parameters and recipe parameters and the setting of at least one correction parameter comprises the choice of a parameter from a parameter set (Continued)

comprising process parameters and material recipe parameters.

18 Claims, 7 Drawing Sheets

(51) Int. Cl.
  *G05B 15/02* (2006.01)
  *G05B 17/02* (2006.01)

(56) References Cited

U.S. PATENT DOCUMENTS

2002/0171167 A1* 11/2002 Chatterjee ................ B28B 1/00
  264/138
2006/0036345 A1* 2/2006 Cao ..................... G05B 13/027
  700/108
2009/0299509 A1* 12/2009 Diezel ................ G05B 19/4069
  700/97

FOREIGN PATENT DOCUMENTS

| EP | 1166944 A1 | 1/2002 |
| EP | 1166994 A1 | 1/2002 |

* cited by examiner

ITERATIVE METHOD AND PRODUCTION CONTROL UNIT FOR CONTROLLING PRODUCTION PROCESS

RELATED APPLICATION

This application is a National Phase filing of PCT/EP2011/060365, filed Jun. 21, 2011, and claims priority to European Patent Application No. 10167172.5, filed Jun. 24, 2010, the subject matter of which are incorporated herein by reference in their entirety.

FIELD OF THE INVENTION

The invention relates to iterative production process control. In particular the invention relates to an iterative method for a controlling a production process, a production control unit for iteratively controlling a production process, a production device, the use of a production control unit, a computer program element and a computer readable medium.

BACKGROUND OF THE INVENTION

The performance properties of plastic products are the objective of plastic engineering. Overall, the engineering activities can be divided in three different engineering activities, which are commonly done separately in different organizations or companies. Material suppliers normally optimize the material and apply the tailoring of the material recipe to application needs. The quality engineering converts the optimized materials under optimized processing conditions. The original equipment manufacturers (OEM) are responsible for the product quality and the functionality of the part produced. By means of application engineering the performance properties of the product is determined.

Plastic is the general term for a wide range of synthetic or semi synthetic polymerization products. Generally, such products are producible by polymerization reactions, namely addition polymerization or condensation polymerization, and may contain other substances to improve performance or reduce costs.

Thereby a polymer is a substance composed of molecules composed of repeating structural units, or so called monomers connected by covalent chemical bonds. Well known examples of polymers include plastics, DNA and proteins. Simple and known examples may further be polypropylene (PE), polypropylene (PP), polystyrol, polyvinylchloride (PVC), polytetrafluorethylen (PTFE), polymethylmethacrylate (PMMA), polyamide (PA), polycarbonate (PC), polyethylenterephthalat (PET). Depending on the application needs, a plastic material is tailored by means of different constituents and adapted proportions of these constituents. Often a polymer is processed with one or more additional substances or additives. These substances may be used as dissolved or not dissolved (pure) additions to the polymer. In case of dissolved additives, the solvent is called a masterbatch. Also these masterbatches may determine and influence the properties of the material that is to be produced. These masterbatches may by themselves be a polymer and any state like solid state, liquid state or gaseous state is used during industrial plastic production. Furthermore more than one masterbatch may define a final recipe of a masterbatch.

SUMMARY OF THE INVENTION

It may be an object of the invention to provide an improved controlling of a production process.

This object may be realized with the features of one of the independent claims. Advantageous embodiments of the invention are described in the dependent claims.

The described embodiments similarly pertain to the iterative method for controlling of a production process, a production control unit for iteratively controlling a production process, a production device, the use of a production control unit, a computer program element and a computer readable medium. Synergetic effects may arise from different combinations of the embodiments although they may not be described in detail.

Further, it shall be noted that all embodiments of the present invention concerning a method, may be carried out with the order of the steps as described, nevertheless this has not to be the only and essential order of the steps of the method. All different orders and combinations of the method steps are herewith disclosed.

According to a first exemplary embodiment of the invention an iterative method for controlling a production process of at least one of a compound material and a product formed out of the compound material is provided. Thereby the method comprises the steps of providing for a first production at least one nominal parameter to the production control unit which decides whether a setting of at least one correcting parameter for a subsequent process cycle is necessary. The decision is based on the analysis of the indicating parameter and the nominal parameter. Thereby the indicating parameter and the nominal parameter are selected from the group consisting of process parameters, material recipe parameters and product property parameters. Consequently, the correcting parameter is selected from the group consisting of process parameters and material recipe parameters.

In this connection, two or three indicating parameters and two or three nominal parameters may be used simultaneously, wherein these parameters include at least one process parameter, one material recipe parameter and one product property parameter.

It should be noted that the terms "providing a parameter", "selecting a parameter" and "setting a parameter" comprise the choice of a parameter from a parameter set, as well as the determination of the value of the chosen parameter. For example providing, selecting or setting the process parameter "pressure: p=500 bar" as a correcting parameter comprise the choice that "pressure" shall be a correcting parameter as well as the determination of the value 500 bar.

Furthermore it shall be noted that the term "production control unit" may be understood as a product control unit which aims the optimization of the part and material properties to the defined needs (nominal parameter). This represents the fact, that this unit is enabled to control a part production process or converting process, a material composition (or recipes) or both of them at the same time.

The "production control unit" may thereby be an integrated circuit for example within a computer with a stored computer program on it. It may also be a computer program element that is run on a general purpose computer. Further, the production control unit may comprise a display for displaying the settings of nominal parameters, ongoing processes, calculations and results to a user. The production control unit may be operated automatically, but also a manual intervention and manual operation by a user is possible.

The production control unit may further be connected to or interacted by simulation programs that may predict in a short time period, i.e. online, the consequences of varying any kind of process parameter and/or of varying constituent and constituent proportions of the material composition (material recipe parameters) on the final performance of the product produced. Thereby, the consequences of varying any kind of process parameters are determined be executing process simulations, the consequences of varying constituent and constituent proportions of the material composition are determined by material property simulations, and the final performance resulting from these process parameters and constituents/constituent properties are determined by application simulations. Furthermore, the production control unit may directly be connected to a more professional information system or data base (stochastic) of for example a material supplier which allows a professional analysis (optimization) of the current production setup. This corresponds to a professional analysis of process parameters and corresponding recipes which may lead to an improved customer support by a material supplier.

The term "production process" may comprise all kinds of converting processes for example a converting process of different materials like polymers and masterbatches and additives into for example plastic products (e.g. bumper facia). As the quality of plastic parts depends on production process settings as well as on the final material composition (recipe), the term production process comprises both relevant parameters, the production process of plastic parts and the production of the "final" material recipe.

Furthermore, the "nominal parameter" may be a given or desired parameter with a value which defines an aim or a demand. Therefore the nominal parameter may be used as a reference. The nominal parameter may be defined or predefined automatically or manually. Thereby any property of the material to be processed, any property of a production or converting process and any property of the final product (plastic part) may be a nominal parameter.

Further, any nominal parameter is controlled within a bandwidth including a desired minimum and a maximum value. The objective of that control mechanism is to achieve the target of each nominal parameter demanded. If this is not possible by means of the material recipe and/or process parameter a warning is prompted and further suggestions are proposed (boundary of achievement). Nominal parameters may be further ranked in terms of importance.

Examples for "material/product properties" that may mainly be determined by process parameters of the production process are mass, shrinkage (dimensions), warpage, effects of the product surface appearance like sink marks, gloss and tiger stripes. Examples for "material/product properties" that are mainly determined by the material recipe parameters are color, density, the material mechanics and thermo-mechanics like elastic modulus, yield properties, strain at breakage, toughness, viscoelastic behavior (creep) and the thermal expansion coefficient. Further on the material rheology, the material shrinkage, the surface appearance and parameter of emissions are primarily determined by material recipe. As examples for properties of the final product, the product stiffness, the resistance against impact, the product dimensions and the warpage are mentioned. These are all examples for nominal parameters. Furthermore, the provision for the at least one nominal parameter may be done manually by a user or automatically by a computer program that takes information out of a database on basis of certain predefined information like a prior production date.

Furthermore, an "indicating parameter" may be a measurement or analysis parameter that may comprise parameters concerning a production process, parameters concerning a recipe of the compound material, parameters concerning properties of the product produced (the final product) and parameters concerning the environmental conditions of the production process (e.g. temperature).

Examples for "process parameters" may be melt temperature, tool temperature, injection speed and/or profile, switching point, packing pressure and profile, packing time, cooling time, process time or any other process parameter anyhow controlled by default processing controllers of production machines (e.g. injection molding machines). Furthermore, the actual process parameters may be continuously monitored which means cycle by cycle during the production in case of e.g. injection molding, or continuously in the case of e.g. extrusion processing by the production control unit. Thus, the production control unit may for example be an injection molding control unit.

An indicating parameter further comprises material recipe parameters. Examples for "material recipe parameters" may be any kind of performance masterbatch and the corresponding masterbatch proportion as well as any other controllable parameter of a dosing system. A certain performance masterbatch contains concentrated substances which appropriate dispersed in the final material influences specific properties of the material and consequently of the product produced. For example the particle content of a particle reinforced polymeric composite may be a material recipe parameter. The recipe formulation, constituents and corresponding proportions, are anyhow monitored and controlled cycle per cycle by a dosing control unit. These indicating parameters or values of an indicating parameter are also transmitted to the production control unit cycle by cycle or continuously.

Examples of "indicating parameters" of the final product may be measured values of e.g. color, mass, dimensions, stiffness, impact performance, surface appearance, emissions, odor, which are measured automatically or manually, regardless how many are measured.

It shall further be noted that all three indicating parameter types, such as process parameters, material recipe parameters and product parameters are monitored during or after a cycle and are automatically/manually shared with the production control unit. Alternatively, the production control unit can perform only based on the indicating parameters of the process or the indicating parameter of the material recipe.

Thereby, the at least one indicating parameter can be provided by an automatic measurement or analysis and may be provided online. But also a manual setting of the indicating parameter by the user (in case of another desired value by the user) is possible.

This may be done during a first production cycle which constitutes the beginning or the first step of the iterative method that leads to an improvement of a production process during multiple process cycles. A quality control of the produced material or product is therefore achieved.

Further, the term "correcting parameter" may comprise process parameters and material recipe parameters. The "material recipe parameters" may for example be any kind of performance masterbatch that is to be used, any proportion of any masterbatch that is to be used and any other controllable parameter by the dosing system may be included by the term "material recipe parameter". Both correcting parameter sets are continuously monitored (e.g. extrusion) or cycle per cycle (e.g. injection molding) by means of the production control unit. This may lead to quality monitoring and a self-learning system that is able to quickly produce a product made of the compound material that fulfils a desired value given by the nominal parameters.

Further, the correcting parameters are defined on basis of the analysis logic of the production control unit. They may be redefined only depending on the efficiency, process parameters or material recipe parameters. In some cases, both parameter sets are redefined at the same time. In case a nominal parameter cannot be fulfilled by defining any correcting parameter, the production control unit may prompt an alert to the user. In other words: As the production control unit is provided with knowledge about the material recipe that is used to produce the compound material or the product formed out of the compound material and the knowledge about the production device or the production process, the production control unit calculates by means of logic and arithmetic dependencies an effective way to produce the compound material and/or the product (process setup). On basis of the analysis (simulation) the most efficient correcting parameter set is defined to reach the target nominal parameter of the produced products. Thereby influences of changing a parameter on other parameters are considered by the production control unit.

In other words, the production control unit objects the quality of the final product (nominal parameter) by controlling the properties of the produced compound material and/or by controlling process parameters of the production unit. The production control unit permanently monitors, whether the nominal parameters are fulfilled. If this is not the case, the production control unit chooses correcting parameter and values of that correcting parameters for the subsequent process cycle for improving the material recipe and/or process parameter such that the final product properties are fulfilled.

It shall be noted that the material recipe parameters and the process parameters may influence each other in a different manner. In that case the production control unit knows the strength and effects of these interactions on the properties of the produced part due at least one of a database and/or an algorithm and simulations that may be provided to the unit. This database may comprise the knowledge about the used materials, recipes and processing facts. Furthermore, numerical simulations may run interactively and provide the production control unit with detailed information about the influence/sensitivity of process parameters and/or material recipe parameters on certain quality related parameters of the final product.

Thereby the term "compound material" comprises any material that has been used during the production process out of at least two different raw materials. For example converting a polymer material with at least one additional masterbatch to any kind of plastic material may be an application for the iterative method described herein. For example a matrix polymer and one or several performance masterbatches which are mixed together directly on an injection molding machine by means of a dosing control unit may form the production process that is controlled by the iterative method according to the invention.

Further it is noted that this example of any kind of plastic material production process does not limit the inventive iterative method for a production process to that industrial branch or production process.

Both, the process settings and the material recipe are very complex systems, which on top depend on each other. For instance, a material recipe A and material recipe B react on defined similar processing conditions in different manner. It is also a fact that material recipe A reacts differently in two different production tools at similar processing conditions, if for instance the wall thickness or the flow length of the product differs. Thus, processing conditions influence the product properties in a different manner and the process parameters cannot be varied arbitrarily. Process settings and all their dependencies are know-how that is provided to the production control unit. Furthermore, the optimum material recipe and all effects of different substances of the masterbatches on the material performance under given processing conditions are also know-how of the inventive iterative method and provided to the production control unit by for instance interactively generated numerical simulations.

Advantages of this inventive method may therefore be a cheap and effective production of a material and products, for example of plastic materials and plastic products. Further on the method avoids working with a ready to use material and finds out iteratively, which material composition is the best under consideration of desired and given values. In other words, the method makes the process to a self-learning production process. This allows not only to optimize process settings, but also to optimize the material recipe to the demand of the product properties defined in the nominal parameter sets. Consequently, small adoptions of the tool (i.e. shrinkage) may be solved by the optimized interrelating parameter sets of the material recipe and process parameter. Compared to common industrial processes, a faster and cheaper tool setup can be realized.

These advantages of the method may be seen as effects of the simultaneous and iterative combination of the knowledge about material, recipe, process and product design.

Furthermore, due to the inventive method a consistency of running processes in regard to the product properties may be guaranteed. Simultaneously a quality control of the production may be realized. Reduction of logistics and reduction of number of compounds tested in tool-setups may be a positive effect of the inventive method and may therefore lower the production costs. An increase of freedom to operate with different material and processes may be another advantage of the inventive method. An online support by professionals or professional analytical and/or numerical simulation systems may be an additional feature of the invention.

Besides these advantages of the invention, there may arise economical effects and further advantages like a reduction of the compound complexity that affects the production, the logistics and the transportation. Also standardized performance masterbatch production of high lot sizes may be possible due to the inventive method. Also a new business model for a material supplier for trading specific matrix materials and several corresponding masterbatch materials is herewith described. For example the know-how of the usage can be a leasing business model for different clients. Thereby, a production of open compound style is possible in which the material responsibility has not to be transferred to the client. Overall, the compound complexity may be reduced and at the same time the consistency of the product production is improved.

In other words: in common plastic production, the fields of application engineering, including material and designing components, and the field of quality engineering, including processing, tooling and material components are jointly applied by the production control unit.

According to another exemplary embodiment of the invention the method comprises the step of setting of at least one correcting parameter for a subsequent process cycle on basis of the indicating parameter and the nominal parameter.

According to another exemplary embodiment of the invention the method comprises the steps of calculating a first efficiency of a first possible correcting parameter and a second efficiency of a second possible correcting parameter with respect to the at least one nominal parameter and selecting the correcting parameter from the first and the second possible correcting parameters, which has a higher efficiency.

In any embodiment the production control unit determines the most efficient change of correcting parameters. Strait forward control variable setting by means of calculated control variables may be possible. Thereby a fully automated process that considers process parameters, product property parameters and material parameter is provided by for example equations and/or database values and/or numerical simulations. Also, a manual control by an operator is possible, which corresponds to a partial automation. Further, an implementation of an artificial intelligence that leads to a self-learning control logic is possible. The unit may further be manually supported, which means that results of experiments conducted by the user are used.

In other words, the production control unit calculates different possibilities with different correcting parameters to achieve the desired values of the nominal parameters. This is done by combining knowledge about the material, the production process and the physical form of the product. By providing the knowledge about the raw materials that are to be processed to the compound material to the production control unit and by providing knowledge about the production process and the production device used for the process to the production control unit, the production control unit may combine this knowledge quick, efficient and cheap for fulfilling the nominal parameters. All possible effects and interrelations of the parameter sets may be considered by the production control unit.

Therefore, this exemplary embodiment of the invention selects the correcting parameter with respect to the efficiency effecting the nominal parameter. At least one correcting parameter is used if a measured deviation from the nominal parameter is too large. If necessary, several correcting parameters may be used at the same time. An optimization process chooses the most efficient correcting parameters or the most efficient combination of different correcting parameters regardless, if they belong to the group of process parameters or material recipe parameters.

Thereby, the term "possible" shall express, that the correcting parameter of a combination of different correcting parameters may after the calculation be chosen or not, depending on its calculated efficiency.

According to another exemplary embodiment of the invention the method comprises the step of providing data for calculating an element from the group comprising the efficiency of correcting parameters and effects of correcting parameters by a database and/or a simulation routine.

The term "effect" shall thereby express, that interactions of changes of correcting parameters with other parameters are taken into account during a calculation. It shall explicitly be noted, that process parameters and material parameters may interact.

Thereby the database may be included within the production control unit but also an external provision, such as an online connection of the database to the production control unit, is possible. Thereby the knowledge of all raw materials that are to be used for the process and how they react with each other and the knowledge about the process and the processing device may be integrated in the database. Any interaction of changes between the material side, the process side or between both of them are therefore calculable for the production control unit.

Hence a closed loop control of the part properties comprising the verification of the process parameters and of the material recipe parameters may be possible by the production control unit. By means of the production control unit an open compound concept is enhanced due to the consideration of both parameter sets, as well as the consideration of part properties. On basis of the actual monitored process parameter and material recipe parameter the production control unit suggests the most efficient setup of both systems (process parameters and material recipe parameters). Only by means of the production control unit consistent product properties may be producible, even if more than one production or converting process is considered.

According to a further embodiment of the invention the material recipe parameters comprise parameters of different raw material constituents and parameters of the proportion of the constituents.

For example in the field of plastic engineering the material to be produced is optimized by tailoring the material recipe to application needs. These needs may be described by or translated into nominal parameters. Examples for "material recipe parameters" are different kinds of polymer matrixes, additional substances like rubber, a second substance like talcum, a color masterbatch and a plurality of additives. These substances may be used as dissolved or not dissolved (pure) additions to the polymer. Also these masterbatches (solvents) may determine and influence the properties of the plastic material that is to be produced. These masterbatches may by themself be a polymer, and any state like solid state, liquid state or gaseous state is used during industrial plastic production. Further, even more than one masterbatch may define a final recipe masterbatch.

According to another exemplary embodiment of the invention the setting of at least one correcting parameter by the production control unit comprises initiating a different production process in order to achieve the at least one nominal parameter.

Thereby the production control unit may initiate a change of the production/converting process, if it is necessary to fulfill the nominal parameters on a fast, cheap and effective way. This may be realized with the same production device, but also another production device may be addressed and activated by the production control unit. Therefore any connection between the production control unit that is needed for activating different production devices may be comprised within the production control unit. But also switching between different production processes in one and the same production device is possible.

According to another exemplary embodiment of the invention the method comprises further the following steps: Analyzing at least one of the material and the product with respect to the at least one nominal parameter, providing for at least one new value of an indicating parameter for the subsequent production cycle on basis of the analysis and on basis of the at least one nominal parameter and providing the new value of the indicating parameter to the production control unit.

Wherein "analyzing" the material and the product comprises analyzing material properties and product or part properties. It shall be noted that for the whole document the terms "measurement" and "analysis" are used equally. This similarly pertains to all verbal forms of "to analyze" and "to measure".

After having defined the nominal parameters in a first step the subsequent produced material or product is analyzed or measured. It is determined whether it fulfills the desired value represented by the nominal parameters. The analysis or measurement leads if necessary to a value or several values of (a) correcting parameter(s) of the indicating parameter set that are used for the next production cycle.

This is the verification information for the production or product control unit which may decide on this basis and which may define or redefine new correcting parameters. In other words, producing, measuring with respect to the predefined nominal parameters, gathering new (corrected) values of indicating parameter and furthermore providing the new values to the production control unit, which redefines the next production cycle in order to improve the properties that have been analyzed or measured and that have not already reached a desired value may be steps of the method according to an exemplary embodiment of the invention.

According to a further exemplary embodiment of the invention the analysis and the provision of the at least one new value out of indicating parameter set are processed automatically and/or by a user.

This includes using database values, using calculated parameters of interrelations or using results of simulation programs, which compute virtually either material properties, details of converting processes, or properties (application tests) of the final product (part).

If the material or product properties that are to be analyzed are gathered by a measuring device, the new value of an indicating parameter is processed automatically and may be sent to the production control unit via a communication device. This communication device may be wire bound or wireless. It is for example possible to provide an online connection from a unit that performs the analysis, the measurement or the simulations and creation of the values of indicating parameter to the production control unit, but also a provision by a user that manually inputs the new values of indicating parameters or a completely new indicating parameter set via a user interface. This may lead to a manual feedback of the user after having checked the properties of the produced material or product (part).

According to a further exemplary embodiment of the invention the method comprises the step of providing a closed loop control of the product property parameters comprising a verification of the process parameters and/or the material recipe parameters. As long as a "closed loop" in a product production of plastic conducts the controlling of both parameter groups, process parameters and material parameters, this control to be considered as falling within the meaning of the method described herein.

According to a further exemplary embodiment of the invention the production process is selected from the group consisting of injection molding, compression molding, extrusion, blow molding, spinning, any continuous and discontinuous production process and any production process in which material recipe parameters and process parameters influence the final product properties.

Therefore any continuous and any discontinuous converting process of plastics may be including in the term "production process". During these processes a time control of the dosing and a control of different locations of the dosing is optional. Further, the number of controlled dosings is optional, in the case of plastics production, a minimum of one additional raw material to the polymer matrix may be needed.

Examples for produced materials and products may be any plastic parts produced for the automotive industry like cover sheets, faceplates, seat shells, displays, display frames, structural components, frontends, fans, components of the ventilation system, controls and instruments, shock absorbers, dampers, fenders, mudguards, wings, parts of the backdoor, body panels and decorative strips. Further on bodies or housings of washing machines, barrels of washing machines, basements of washing machines, housings of vacuum cleaners, refrigerators or any plastic part used in the appliances industry or in the transport and logistics industry. Also parts of pipe systems like water or waste systems may be included. Furthermore, film products, profiles or semi-finished parts may be included regardless if these products are produced in discontinuous or continuous production processes.

As the method is applicable to many different production processes, a general and effective method for producing high quality and consistent materials and products under consideration of given desired values within a short period of time may be possible.

According to a further exemplary embodiment of the invention, the production process converts at least one polymer and at least one masterbatch into the final material composition (compound) of the product/part.

Thereby, the term "masterbatch" may include for example a color masterbatch or any other additive substance that has to be mixed together with any polymer matrix to produce plastic material with certain properties. The plastic material is described as a compound material that is processed out of least two different raw materials like a polymer matrix and a masterbatch.

According to a further exemplary embodiment of the invention, the material is any kind of plastic material.

According to a further exemplary embodiment of the invention, the material is selected from the group consisting of polypropylene, polyamide, polymethylacrylat, melamine resin, rubber like materials, any other thermoplastic and thermoset polymer, unreinforced composites, reinforced composites and partially reinforced composites.

Thereby any possible blend out of these materials is included within this exemplary embodiment. Unreinforced composites may consist of one or more homogeneous polymers that could be blended. Adding additives is also possible. Reinforced composites may be defined by a heterogeneous material structure (phase morphology) that may exist on nanoscale, microscale and macrosale. Further, a reinforced composite may consist of one or more polymer matrices, several filler systems and/or additives. Particularly reinforced composites may consist of hard and soft particles or any combination of these. Further, any proportion of the herein described blends, additives, particles and color pigments are possible.

Further, the substances of recipes used during a herein discussed production process may either be dissolved in another material, wherein the solvent is called masterbatch or are in the pure state (pure talcum particles). Masterbatches may further be diluted or undiluted by another material. Further on the substance concentration of the components being dosed separately may be optional, in other words, pure particles as well as performance masterbatches of any particle content are possible. Further, a mixture of dissolved substances may be possible. Thereby, the number and amount of substances that are to be dosed may be unlimited. Further, different dosing systems may operate during the production process at the same time. The number and amount of substances that are dosed by different dosing systems may be unlimited. Furthermore, the number or substances defining a recipe may be unlimited. Furthermore, the masterbatch material may be optional. For example, the masterbatch material may be a polymer, a solid matter, a liquid, or a gas. Further, the number of substances dissolved in one masterbatch matrix may be unlimited. Furthermore, the masterbatch carrier can either be the same material as the recipe material of the product (most of the volume) or it can also be a substance which effects itself the performance of the recipe material. The matrix carrier could also be the same matrix material as the matrix of the final recipe. Thereby, the matrix material is the main material carrier of the final recipe, matrix carrier of the substances is the major material of the masterbatches, all matrixes can be the same or different. Therefore a variation of the masterbatch may be possible. Further, the number of matrices defining one masterbatch carrier may be unlimited. The number of single masterbatches controlled in different dosing units may also be unlimited. Some substances are pure and therefore not dissolved, some are dissolved in masterbatches. The number of single substances defining the recipe may be unlimited wherein minimum one additional substance that may be dissolved or not dissolved has to be dosed in controlled manner as suggested. The substances being controlled dosed may effect one single final property or several different properties. The number of effected properties and the number of substances that are dosed may be optional. It has to be noted that a single substance in general effects different properties in different manner. In addition one substance may interrelate with another substance and distinguishes the required effect. To a minimum one single additional substance may be dosed in controlled manner during the converting process.

According to a further exemplary embodiment of the invention a production control unit for iteratively controlling a production process of at least one of a material and a product formed out of the material is presented. This production control unit comprises a calculating unit and an input interface, and wherein the input interface is adapted for receiving at least one nominal parameter, wherein the input interface is further adapted for receiving at least one indicating parameter in a first production cycle. Further, the calculating unit is adapted for calculating at least one correcting parameter for a subsequent process cycle (or time) on basis of the indicating parameter and on basis of the nominal parameter, wherein the indicating parameter and the nominal parameter are selected from the group consisting of process parameters, material recipe parameters and product property parameters. Further, the correcting parameter is selected from the group consisting of process parameters and material recipe parameters.

A "production process" in the normal case is a discontinuous process in which the production control unit receives indicating parameter values discontinuously. In other words this happens cycle after cycle. Alternatively, in the case of a continuous production process the production control unit receives the information of indicating parameter continuously over a production time.

By applying such a production control unit to any kind of production process especially to production of plastics and plastic products a closed loop control of the product properties including the verification of the process parameters and the material recipe parameters is described. Only by the consideration of both parameter sets, process parameters and material recipe parameters, a closed loop production control unit is realized, which determines the properties of the produced product. This may be realized by the inventive production control unit. On basis of the actual monitored process parameter and material recipe parameter, the production control unit suggests the most efficient setup of both systems. This is done by calculating and applying the most efficient correcting parameter or parameter set for the next production cycle or production time for fulfilling the actual set of nominal parameters (requirements) of the product properties.

According to a further exemplary embodiment of the present invention the production control unit further comprises an output interface wherein the output interface is adapted for initiating a control of production devices on basis of the correcting parameter.

In other words the production control unit may set new process or material recipe parameters of or for the production device, either one of the converting device and/or of the dosing device or of any other relevant device required for the product production.

After having analyzed and measured indicating parameters or values of the indicating parameters and after having calculated the deviation to the nominal parameter process signals are sent from the production control unit via or by the output interface to a production device that is thereby controlled by the production control unit. This is done on basis of the calculated correcting parameter that guarantees that the knowledge about the used materials in combination with the knowledge about the associated converting process is applied best.

According to a further exemplary embodiment of the invention the production control unit comprises at least one measuring device for analyzing at least one of the material and/or one of the product property with respect to the at least one defined nominal parameter.

In order to check the properties and characteristics of the produced material or produced part, different analysis, tests and measurements may be conducted by the measuring device with respect to the properties that have to be fulfilled. The properties to be measured (nominal parameter) are either predefined before having started the production process or they can even be defined during the production process.

For example, if a nominal parameter is a certain Young modulus specified by the OEM (pure material parameter), a mechanical test is applied to the product in order to gather the actual product stiffness which in fact is a function of the material's Young modulus. If the gathered stiffness and therefore the Young modulus does not fit, the most efficient value of a correcting parameter is calculated and defined for improving the subsequent production cycle. The material parameter (Young modulus) may for example be predefined in the OEM's obligation book and checked by for example testing standards (samples) or if possible directly on the product (part), which leads to an actual value of for example the indicating parameter "Young Modulus (Material Stiffness)".

According to a further exemplary embodiment of the invention, the measuring device is selected from the group consisting of a dimension measuring device, a density and a mass measuring device, an optical measuring device, a mechanical measuring device, a magnetic measuring device, a temperature measuring device, an electrical measuring device, a color measuring device, and any sensor being able to measure properties of the product material, the part produced (e.g. dimensions) or of the process.

The material properties may also be measured on standard test specimen withdrawn from the product. Therefore, a user interface for entering the measured values of indicating parameters may be provided.

According to a further exemplary embodiment of the present invention, the production control unit comprises a remote control device wherein the user is enabled by the remote control device to operate the production control unit from any remote position.

This exemplary embodiment may lead to the advantage, that for example a person or a system of the material supplier or of the production device supplier is enabled to remotely control the production process that may take place in a distanced position.

According to a further exemplary embodiment, the production control unit further comprises at least two different simulation units determining the efficiency of correcting parameters and/or the effects of correcting parameters.

According to a further exemplary embodiment, the production control unit comprises at least two different databases storing data of at least one of different production process and/or different raw materials for the production process wherein each database is connected with the production control unit, wherein the production control unit is usable by different users via the connections for different production processes.

It is noted that in another embodiment of this invention, the two databases are equal to each other and there is only one database, in which the properties and all the interrelations are stored.

In other words, a multiple user production control system for iteratively controlling a production process of at least one of a material and a product is presented. As for example described in FIG. 5, the different users with their own different databases of their specific material data and/or specific process data may have access to the production control unit. Therefore, different users at different places suffer from the advantages of the production control unit. They may all have their own application of the production control unit that may be specific to their material and their production process. This may for example be applied in a situation where a material supplier owns the knowledge of the material and material recipes and offers the possibility to different clients who each produce different products with different materials supplied by the material supplier. Sharing the specific knowledge of the material with each specific client in combination with the specific knowledge of the client about the production process leads to an advantage for each client during his own production process. This is possible due to the use of the production control unit that effectively and quick controls and optimizes each specific and different production process.

According to a further exemplary embodiment of the invention a production device for an iteratively controlled production of at least one of a compound material and a product made of the compound material is presented. Thereby the production device comprises a production control unit as described before or hereinafter.

Furthermore the production device may be any device that is able to process at least one of the following processes: injection molding, compression molding, extrusion, blow molding, spinning, any continuous and discontinuous production process and any production process in which material recipe parameters and process parameters influence the product properties.

According to a further exemplary embodiment of the invention, the production device further comprises a material control unit and a process control unit wherein the material control unit is adapted for controlling a choice of different raw material constituents and their proportions of the constituents in combination with the production control unit, wherein the process control unit is adapted for controlling the process parameters in combination with the production control unit.

In other words, the material control unit undertakes the tasks concerning the choice of the material composition and the dosing instead of the production control unit, wherein the process control unit of for example a converting device undertakes the tasks of controlling the process parameters instead of the production control unit. It is to be noted that this is done in combination with the production control unit which means that the indicating parameters for example are measured or analyzed by the material control unit and the process control unit, but they are provided to the production control unit in order to calculate the correct correcting parameters. Furthermore, the correcting parameters are sent from the production control unit to the material control unit and to the process control unit. The material control unit then changes the setup of the dosing system on basis of the new correcting parameters. The process control unit further sets the correcting parameters concerning the production or converting process or any parameter concerning the production device.

The production device may further comprise any kind of a dosing system controlled by the production control unit and a production system controlled by the unit, wherein the unit combines both systems of open compound production.

According to a further exemplary embodiment of the invention, the use of the production control unit for converting any materials into a plastic material forming a product is presented.

According to a further exemplary embodiment of the present invention, a computer program element is presented, which element is characterized by being adapted when in use on a general purpose computer to cause the computer to perform the steps of the method.

According to a further exemplary embodiment of the present invention, a computer-readable medium on which the computer program element is stored is presented.

This computer program element may therefore be stored on a computing unit, which may also be part of an embodiment of the present invention. This computing unit may be adapted to perform or induce the performing of the steps of the method described above. Moreover, it may be adapted to operate the components of the above described apparatus. The computing unit can be adapted to operate automatically and/or to execute the orders of a user or may operate remotely. Furthermore, the computing unit can request the selection from a user to process the input from the user.

This embodiment of the invention covers both a computer program which uses the invention right from the start, and a computer program, that by means of an update turns an existing program into a program based on the invention.

Further, another exemplary embodiment of the present invention may be a medium for making a computer program element available for downloading, which computer program element is adapted to perform the method according to one of the above embodiments.

Another aspect of the invention may be, that material knowledge, processing knowledge and knowledge about the interrelating effects of both in forming specific properties of products are combined in such a way that a fast, effective, consistent, cheap and multiple usable plastic production from at least two materials is executed. Additionally this may be controlled remotely, which allows to control multiple productions by means of one single production control unit (multiple tasking).

Another aspect of the invention may be, that simulation programs compute the indicating parameter of the material composition and/or the processing parameter for defined nominal parameters of the product properties which at least consists of one polymer and at least one masterbatch converted into a compound material. Thereby any computational method or any combination of computational methods—programmed empirical knowledge, stochastic analysis (database), physics based analytical models or detailed numerical simulations—can be applied for finding either the best initial setup of the indicating parameters or the most efficient corrections of any indicating parameter. Furthermore, the simulation methods (programs) can then in a next step be linked with numerical methods for optimization and/or inverse engineering. All these computer programs can directly interact with the production control unit or the computer program can also run remotely.

It may be seen as the gist of the invention that knowledge about materials and knowledge about production processes or production devices are combined to achieve a fast, effective, consistent, adapted or cheap controlling a production process.

The aspects defined above and further aspects, features and advantages of the present invention may also be derived from the examples of embodiments to be described hereinafter. The invention will be described in more detail hereinafter with reference to examples of embodiments to which the invention is not limited.

DETAILED DESCRIPTION OF THE DRAWINGS

Figure 1:
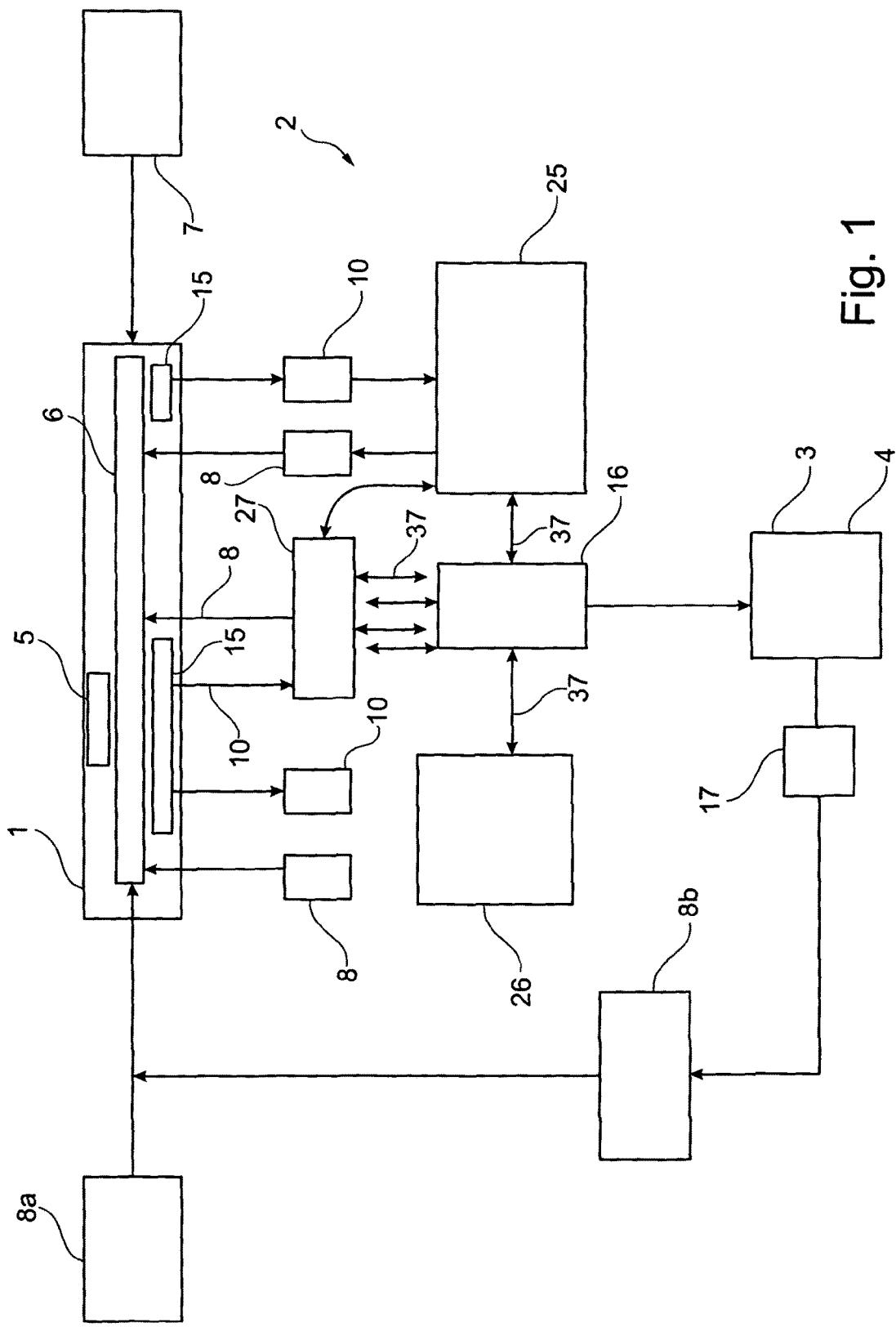
FIG. 1 schematically shows a production control unit according to an exemplary embodiment of the invention.

Similar or relating components in the several figures are provided with the same reference numerals. The figures are schematic and not fully scaled.

FIG. 1 shows an exemplary embodiment of a production control unit 1. It may comprise a calculating unit 5, an input interface 6 and one or several output interfaces 15. Nominal parameters 7 may be predefined by a user or may be delivered by a database to the input interface 6. They may also be changed during the production process 2. Further, a manual setting of indicating parameters 8*a* may be done by a user by means of, for example, a display. But also an automatic or online setting of the indicating parameters 8*b* is possible. Both settings are provided to the input interface 6. The automatically delivered indicating parameters 8*b* may be generated after a measuring device 17 has checked properties of a produced material 3 or a product 4. This can be done as shown in FIG. 1 after the production device 16 has produced a material 3 or a product 4 in a first production cycle.

Nevertheless additional indicating parameters 8 may be sent to the input interface 6 of the production control unit 1 from a process control unit 26 as well as from a material control unit 25 as well as from a control of the recipe constituents 27. This control of the recipe constituents may also be part of the material control unit. These provisions of indicating parameters are referenced with the numeral 8. All these indicating parameter inputs 8, 8*a* and 8*b* provided to the input interface 6 may then be used by the calculating unit 5 to find a fast and efficient solution for an improvement of the production process by means of finding the most efficient correcting parameters 10 for a second cycle. These correcting parameters 10 may then be sent via the output interfaces 15 to the material control unit 25 and to the process control unit 26. Also the control of the recipe constituents 27 may be provided with correcting parameters 10. As shown through the arrows 37, a communication between the control units and the parts that are to be controlled is provided.

Thus, FIG. 1 shows a production process 2 that is controlled and optimized by the production control unit 1 due to the combined knowledge of the production control unit about material, material behavior under certain processing conditions and knowledge about processing details. Possible interactions due to parameter changes between material recipe parameters, processing parameters and product property parameters are considered by the production control unit for optimization.

If the production control unit 1 is for example applied to plastic engineering it may be possible to combine the knowledge about material of a material supplier that normally optimizes the material and tailor-mades the material recipe to application needs with knowledge of the production device supplier. Further, knowledge of designing the product may be included in the functionality of the production control unit. This means that a correcting parameter may for example be the thickness of a special part of the product to fulfill a certain elasticity. By analyzing the best strategy to achieve a target due to corrected process and dosing settings, the production control unit in combination with the feedback signals of the indicating parameters acts as a closed loop control of the product or material properties.

In other words, the production control unit 1 coordinates and defines by means of the monitored indicating variables 8 and by means of the nominal variables set 7 (target product properties) the correcting variables 10 of the subsequent process time (e.g. extrusion) or for the subsequent process cycle (e.g. injection molding).

On basis of proved and defined dependencies (logic, arithmetic) the correcting variables 10 are set. Thus, due to consideration of any parameter, which defines the final product and/or material properties (process, recipe, process environment), a closed loop control of part properties becomes feasible. The logic decides about the efficiency of correcting variables. In some cases it is more efficient just to adapt the process settings instead of the recipe proportions and vice versa. Nevertheless, any correction parameter can be set by the unit at the same time. The dependencies (logic) of any recipe masterbatch considered (e.g. talcum masterbatch) on the material properties under the consideration of varying process parameter and environments is tested by the material supplier. The information is strictly bonded to the specific masterbatch and therefore provided to the production control unit 1 by the material supplier.

Figure 2:
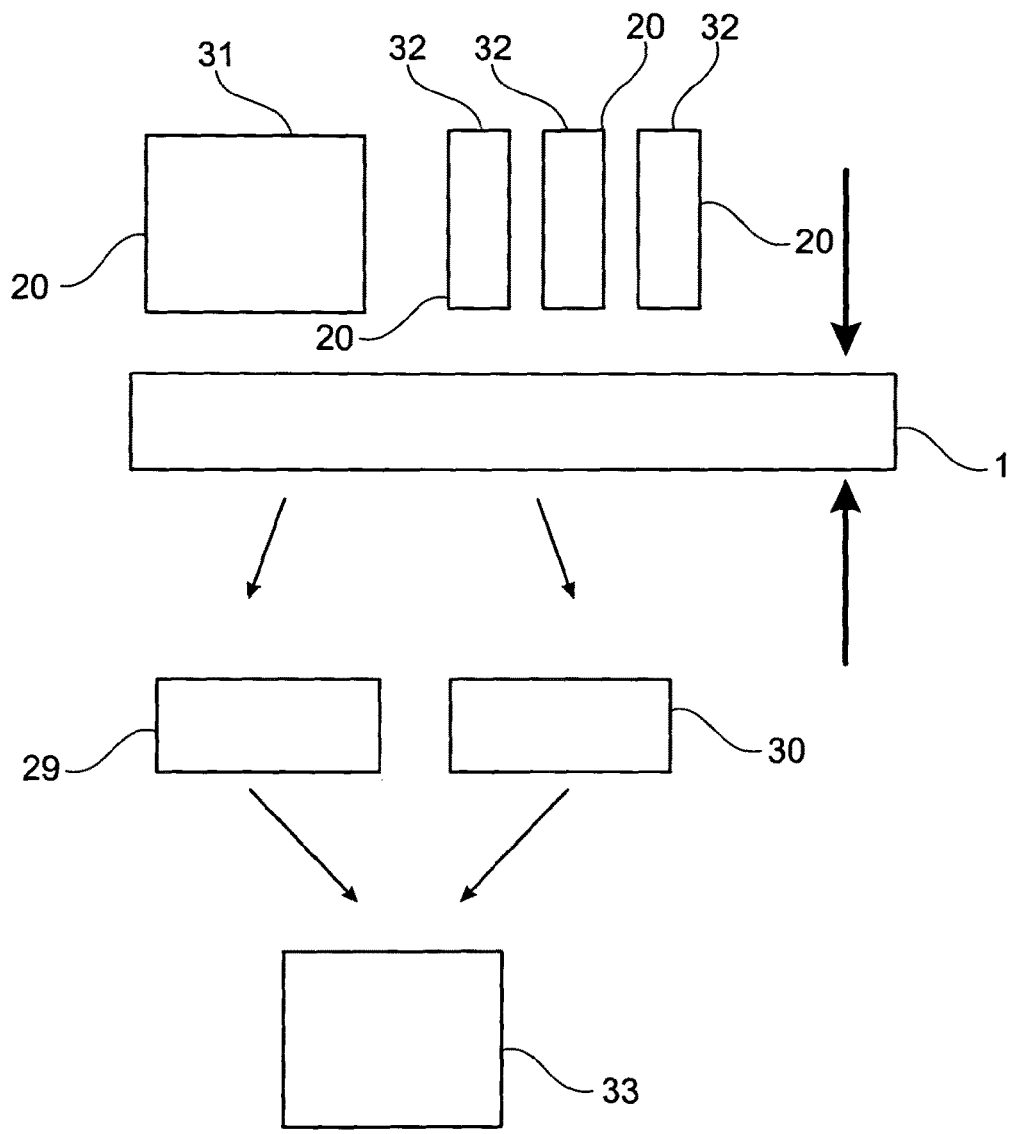
FIG. 2 schematically shows a another production control unit according to another exemplary embodiment of the invention.

FIG. 2 shows another exemplary embodiment of the invention. A production control unit 1 is shown with different raw materials 20. This illustration may therefore be interpreted as an example of plastic production wherein 31 shows a polymer and 32 shows different master batches or additives that may be dosed at different amounts. This control by the production control unit 1 may for example be performed by means of a material control unit 25 (not shown here). As the production control unit 1 is able to initiate different production processes for example a first process 29 and a second process 30 are initiated by the production control unit. An optimization considering different production processes enables to achieve very quickly a controlled product property 33.

In FIG. 2 it can be seen, that the inventive method may be applied to open compound systems. These systems offer for example at least one polymer and at least one additional masterbatch. Further on different production processes may be used during optimizing the whole set up.

Figure 3:
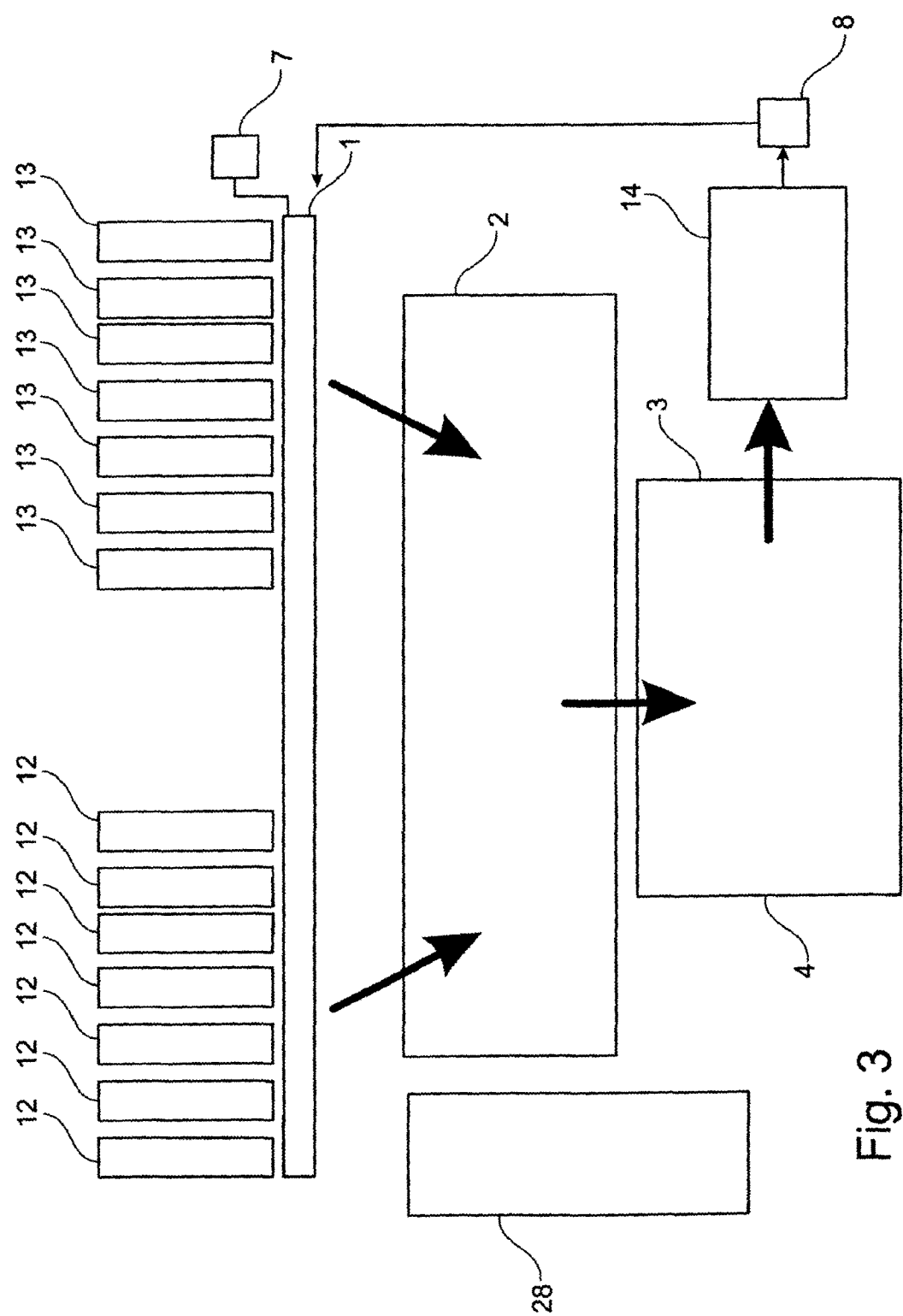
FIG. 3 schematically shows a another production control unit according to another exemplary embodiment of the invention.

FIG. 3 shows another exemplary embodiment of the present invention. Thereby the production control unit 1 is provided with different process parameters 12 on the left-hand side and with the set of different material recipe parameters 13 on the right-hand side. By combining the knowledge of the two different parameter sets the production control unit initiates, controls and redefines the production process 2. Further, the production control unit 1 may take into account, how the environment of the process 28 is evolving. After each production cycle, the material 3 or the product 4 may be checked by a measurement or analysis of a product property parameter 14 which leads to an indicating parameter 8. This indicating parameter 8 is then sent back to the production control unit as a control feedback on which control feedback the production control unit redefines the whole process by defining correcting parameters. This is done on basis of the indicating parameter 8 and the desired value which is represented by nominal parameters 7.

Figure 4:
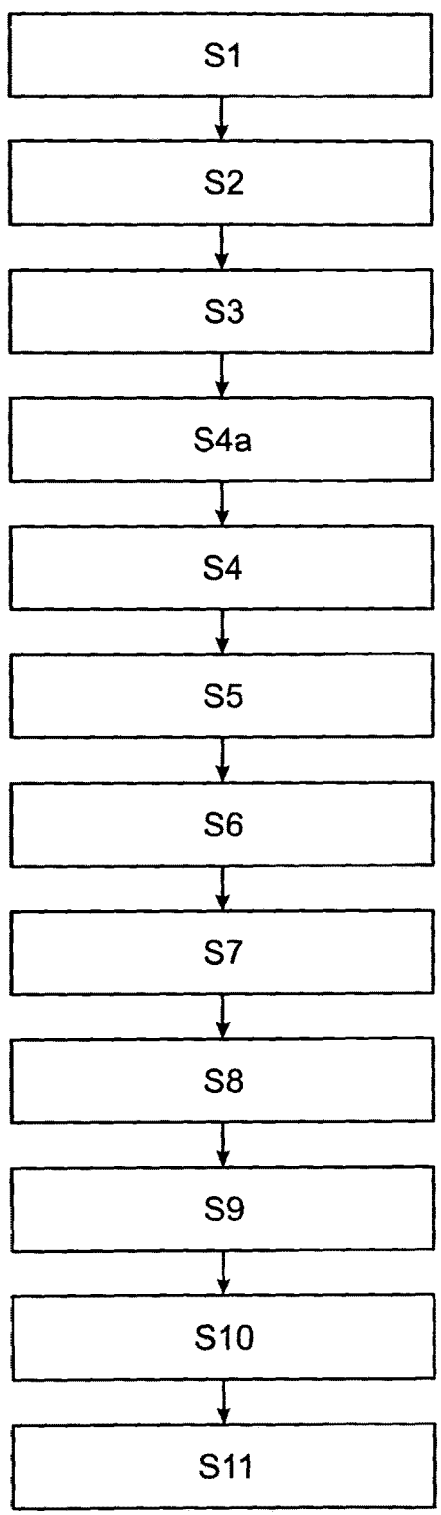
FIG. 4 schematically shows a flow diagram representing a method according to another exemplary embodiment of the invention.

FIG. 4 shows a flow diagram representing an iterative method for controlling a production process 2 of at least one of a compound material 3 and a product 4 formed out of the compound material 3 according to an exemplary embodiment of the present invention. In a first step S1, the production control unit 1 is provided. Then, in step S2 at least one nominal parameter 7 is provided to the production control unit 1, and in step S3, at least one indicating parameter 8 is provided to the production control unit 1 in a first production cycle. In step S4a, it is deciding by the production control unit 1 whether a setting of at least one correcting parameter 10 for a subsequent process cycle is necessary. In step S4, at least one correcting parameter 10 is set by the production control unit 1 for a subsequent process cycle on basis of the indicating parameter 8 and the nominal parameter 7. Further, a first efficiency of a first correcting parameter 10 and a second efficiency of a second correcting parameter 10 with respect to the at least one nominal parameter 7 is calculated. In step S6, the correcting parameter 10 from the first and the second correcting parameters is selecting whichever has a higher efficiency. In step S7, data for calculating the efficiency is provided by a data base or by a simulation routine. In step S8, at least one of the material 3 and the product 4 with respect to the at least one nominal parameter 7 is analyzed. Then, in step S9, at least one new indicating parameter 8 for the subsequent production cycle on basis of the analysis and on basis of the at least one nominal parameters 7 is provided. In step S10, the new indicating parameter 8 is provided to the production control unit 1. In step S11, a closed loop control of the product property parameters 14 comprising a verification of the process parameters and the material recipe is provided.

Figure 5:
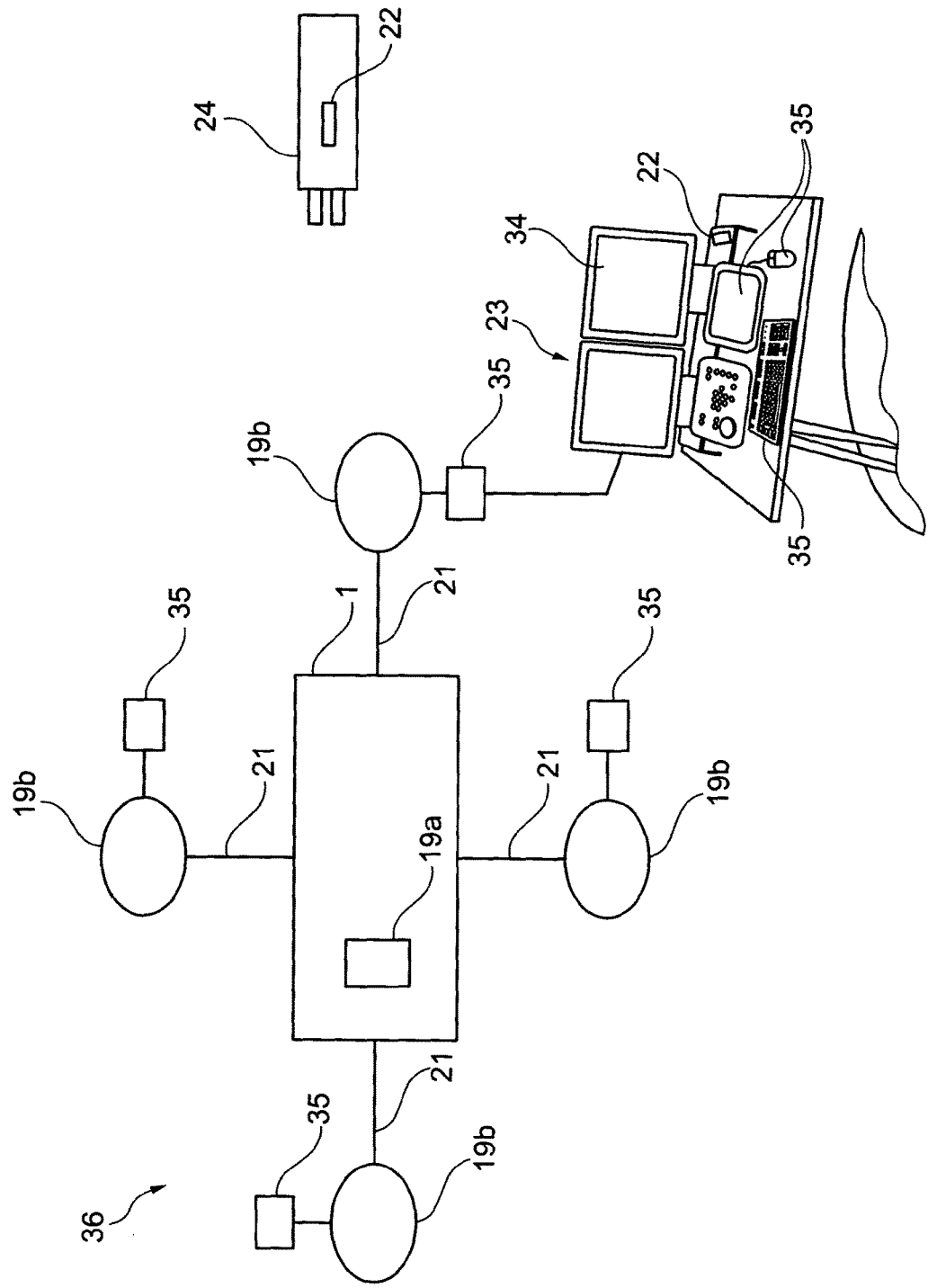
FIG. 5 schematically shows another production control unit according to another exemplary embodiment of the invention.

FIG. 5 shows another exemplary embodiment of the present invention. Thereby 36 indicates a multiple user production control system that comprises a production control unit 1 and several different user databases 19b and user interfaces 35. Via different connections 21 the specific user interfaces and databases 35 and 19b are connected to the production control unit 1. This may for example realize advantages for a material supplier having knowledge of material recipes, constituents of different recipes and material behavior during different production processes. Different users who want to realize and optimize different production processes with different production devices may profit from the combined knowledge control of the production control unit 1. Therefore, the material supplier may dispose the production control unit 1 with his database 19a concerning knowledge about the used raw materials and recipes so that each connected and allowed user may use the inventive method and the inventive production control unit 1 in combination with his specific database 19b concerning knowledge about his specific production process or his specific production device. Furthermore, a computer 23 is shown as a user interface comprising a display 34 and different other user interfaces 35. Also a computer program element 22 may be stored on that computer, but nevertheless the computer program element 22 may also be stored on a computer-readable medium 24, such as the shown USB flash drive.

Figure 6:
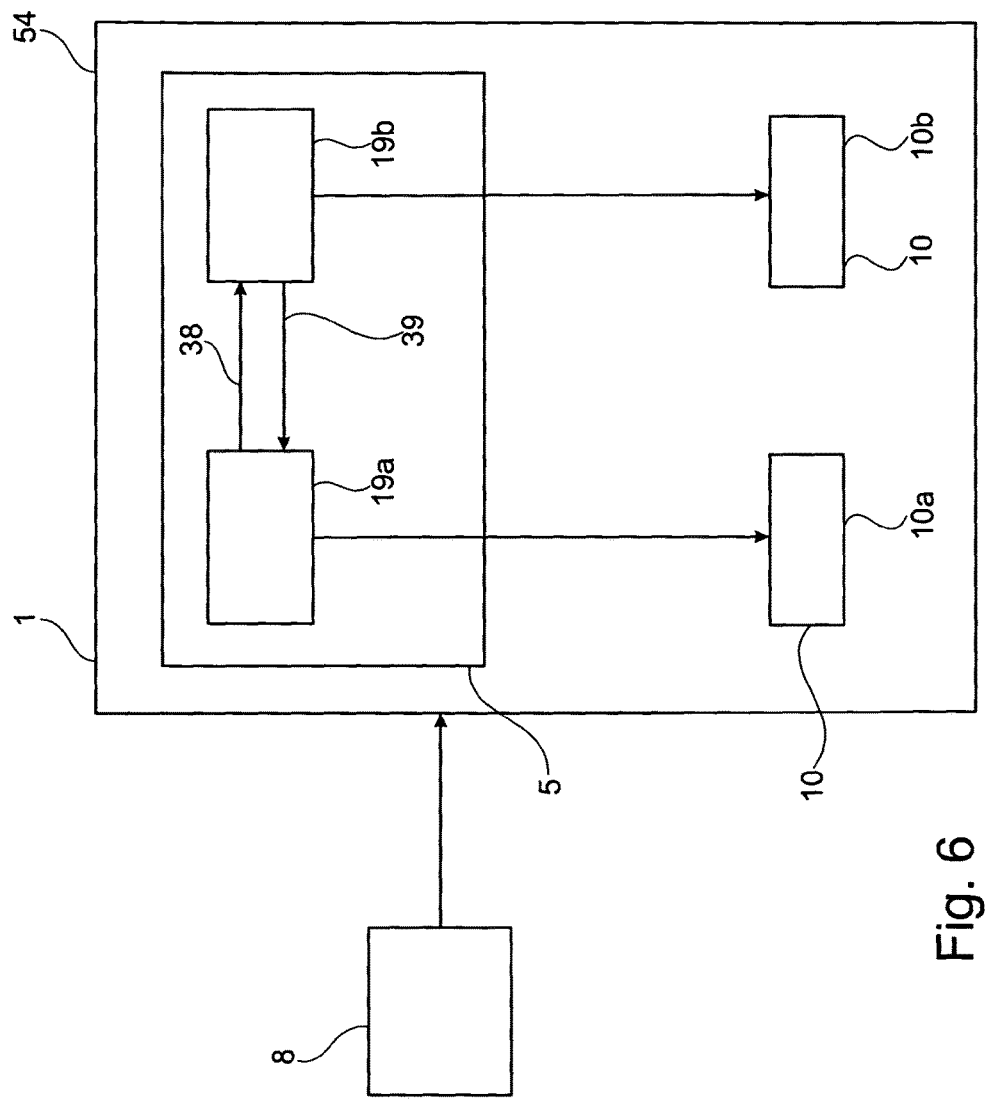
FIG. 6 schematically shows another production control unit according to another exemplary embodiment of the invention.

FIG. 6 shows another exemplary embodiment of the invention. Thereby it is shown how an indicating parameter 8 may lead to two different correcting parameters 10a and 10b for a second cycle. Thereby the indicating parameter of the first cycle 8 is applied or provided to the production control unit 1 that comprises a calculating unit 5. Furthermore, two different databases, a first database 19a concerning knowledge about material and recipes and a second database 19b concerning knowledge about the production or the production device are provided. A third database comprising knowledge about the part design may also be provided, but is not shown here. After having received the indicating parameter of the first cycle 8 the calculating unit 5 redefines the two different correcting parameters 10a and 10b. If for example a first correcting parameter for a second cycle out of the material recipe parameters is defined shown with 10a the calculating unit 5 does a control 38 whether this affects the process settings that are configured at the moment. If a process parameter has to be redefined in order to achieve a maximum of efficiency, a second correcting parameter for the second cycle out of the process parameters is redefined by the calculating unit shown with 10b. After that the calculating unit conducts another control 39 whether this further affects the actual settings of the material recipe parameters. Maybe another redefinition may have to be conducted, however, not in the shown case. The whole process described herein may be seen as the step of setting at least one correcting parameter by the production control unit for a subsequent process cycle on basis of the indicating parameter and on basis of the nominal parameter S4.

Alternatively to the databases or additionally thereto, there may preferably be provided two simulation units in place of the databases 19a and 19b or additionally thereto (e.g. for providing the data of the database). The first simulation unit executes a material simulation for achieving knowledge about material and recipes. A second simulation unit executes a process simulation for achieving knowledge about the production or the production device. A third simulation unit may be provided in place of the third database or additionally thereto, wherein this simulation unit executes an application test simulation, e.g. crash simulation, for achieving knowledge about the part design. Conform to the above described, after having received the indicating parameter of the first cycle 8 the calculating unit 5 redefines the two different correcting parameters 10a and 10b based on the efficiency or the effects of the correcting parameters.

As an example, the indicating parameter of the first cycle may be a value of a measured or analyzed thickness of the product at a certain area of the product. By accessing the database or the simulation routine (application test simulation, e.g. stiffness due to different thickness) concerning product design and product properties, the calculating unit 5 receives the corresponding value of the Young modulus of the product in that area. After a comparison with a nominal parameter defining a maximum value for that Young modulus, the production control unit 1 decides to adjust the proportions of the constituents of the material to generate another, adapted or optimized Young modulus. These new proportion or dosing settings correspond to the first correcting parameter 10a. As the new proportion settings may affect for example the transparency of the product, which transparency is actually perfectly adjusted, the production control unit does a check 38 how this may be readjusted effectively by means of process parameters. For example an increase of process temperature may lead to a desired transparency while accepting the new dosing settings. Therefore the new temperature settings correspond to the second correcting parameter 10b. A further check 39 may be done by the production control unit whether this again and in turn affects other process parameters, other material recipe parameters or other properties of the product. If not, a subsequent production cycle is started with the new correcting parameters 10a and 10b, for an optimized Young modulus and an optimized transparency.

Figure 7:
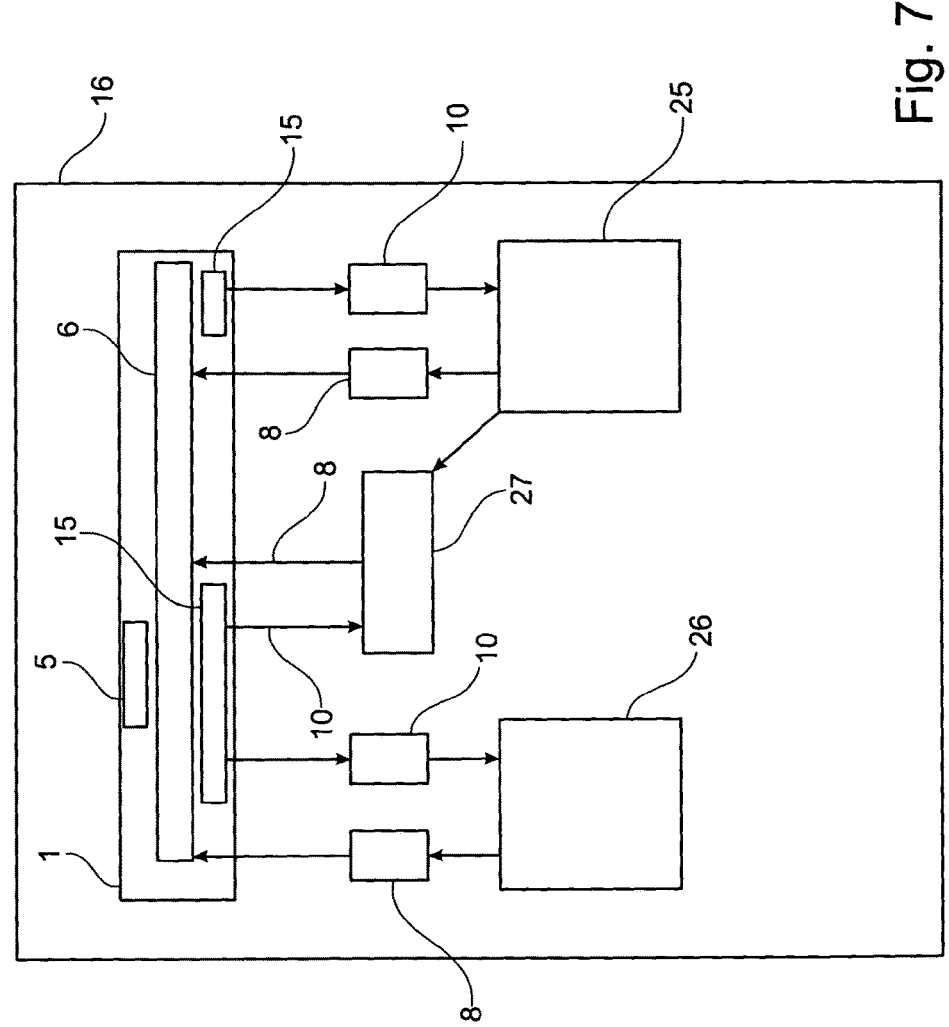
FIG. 7 schematically shows a production device according to another exemplary embodiment of the invention.

FIG. 7 shows a production device according to an exemplary embodiment of the invention. Thereby the device comprises a production control unit 1 with a calculating unit 5, an input interface 6 and output interfaces 15. The production device further comprises a material control unit 25 and a process control unit 26. The control mechanism by indicating parameters 8 and correcting parameters 10 is also shown. Therefore the production unit 16 may be seen as an independent unit to process and produce different materials like for example plastics in a controlled way, as described herein.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

REFERENCE NUMERALS

S1 providing a production control unit
S2 providing at least one nominal parameter to the production control unit
S3 providing at least one indicating parameter to the production control unit in a first production cycle
S4a deciding by the production control unit whether a setting of at least one correcting parameter for a subsequent process cycle is necessary
S4 setting at least one correcting parameter by the production control unit for a subsequent process cycle on basis of the indicating parameter and the nominal parameter
S5 calculating a first efficiency of a first correcting parameter and a second efficiency of a second correcting parameter with respect to the at least one nominal parameter
S6 selecting the correcting parameter from the first and the second correcting parameters whichever has a higher efficiency
S7 providing data for calculating the efficiency
S8 analyzing at least one of the material and the product with respect to the at least one nominal parameter;
S9 providing at least one new value of an indicating parameter for the subsequent production cycle on basis of the analysis and on basis of the at least one nominal parameter
S10 providing the new value of the indicating parameter to the production control unit
S11 providing a closed loop control of the product property parameters comprising a verification of the process parameters and the material recipe parameters
1 Production control unit
2 Production process
3 Material
4 Product
5 Calculating unit
6 Input interface
7 Nominal parameter
8 Indicating parameter
8a Manually set indicating parameter
8b Automatically/online set indicating parameter
10 Correcting parameter
10a Correcting parameter for second cycle out of material recipe parameters
10b Correcting parameter for second cycle out of process parameters
12 Process parameter
13 Material recipe parameter
14 Product property parameter
15 Output interface
16 Production device
17 Measuring device
19a Database concerning knowledge about the used raw materials and recipes
19b Database concerning knowledge about the production/ the converting process or the production device
20 Raw material
21 Connection
22 Computer program element
23 Computer
24 Computer-readable medium
25 Material control unit
26 Process control unit
27 Control of recipe constituents
28 Process environment
29 First process
30 Second process
31 Polymer
32 Masterbatch/additive
33 Controlled product property
34 Display
35 User interface
36 Multiple user production control system 37 Communication between control units and production device
38 Check of influences of material recipe parameter settings on process parameters
39 Check of influences of process parameter settings on material recipe parameters

The invention claimed is:

1. Iterative method for controlling a production process of at least one of a compound material and a product formed out of the compound material, the method comprising the following steps:
   (A) providing a closed loop production control unit;
   (B) introducing into the closed loop production unit at least one nominal parameter for each of the groups consisting of process parameters, material recipe parameters and product property parameters;
   (C) receiving by the closed loop production control unit at least one indicating parameter for each of the groups of indicating parameters consisting of process parameters, material recipe parameters and product property parameters;
   (D) deciding by the closed loop production control unit whether it is necessary to replace and use at least one correcting parameter for any parameter indicated in a subsequent process cycle from the group of correcting parameters consisting of correcting production process parameters and correcting material recipe parameters based on comparing the nominal production process parameters, the nominal material recipe parameters, the nominal product property parameters and indicating production process parameters, indicating material recipe parameters, and indicating product property parameters;
   (E) determining at least one correcting parameter for each of the groups of correcting parameters consisting of correcting production process parameters and correcting material recipe parameters comprising the following steps:
      (E1) calculating a first efficiency of at least one possible first correcting parameters for each of the groups of correcting parameters consisting of production process parameters and material recipe parameters;
      (E2) calculating a second efficiency of at least one possible second correcting parameter for each of the groups of correcting parameters consisting of production process parameters and material recipe parameters; and
      (E3) selecting at least one correcting parameter for each of the groups of correcting parameters from the possible correcting parameters based on the calculated higher efficiency of one of the possible correcting parameters; and
   (F) repeating steps (C) to (E).

2. Method according to claim 1, further comprising the step of:
   providing a simulation routine for determining the efficiency of correcting parameters and/or the effects of correcting parameters.

3. Method according to claim 1, further comprising the step of:
   providing a database with data for calculating an element from the group comprising the efficiency of correcting parameters and effects of correcting parameters.

4. Method according to claim 1, wherein:
   the setting of at least one correcting parameter by the production control unit comprises initiating a different production process in order to achieve the at least one nominal parameter.

5. Method according to claim 1, further comprising the steps of:
   analyzing at least one of the material and the product with respect to the at least one nominal parameter;
   providing at least one new value of an indicating parameter for the subsequent production cycle on basis of the analysis and on basis of the at least one nominal parameter; and
   providing the new value of the indicating parameter to the production control unit.

6. Method according to claim 5, wherein the analysis and the provision of the at least one new value of the indicating parameter are processed automatically or by a user.

7. Method according to claim 1, further comprising the step of:
   providing a closed loop control of the product property parameters comprising a verification of the at least one correcting parameter.

8. Method according to claim 1, wherein the production process:
   (a) is selected from the group comprising injection molding, compression molding, extrusion, blow molding, spinning, any continuous and discontinuous production process and any production process in which material recipe parameters and process parameters influence the final product properties
   and/or
   (b) converts at least one polymer and at least one masterbatch into the compound material.

9. Method according to claim 1, wherein the material is selected from the group consisting of polypropylene, polyamide, polymethylmethacrylate, melamine resine, rubber like materials, stabilizers, additives, color, any other thermoplastic and thermoset polymer, unreinforced composites, reinforced composites and partially reinforced composites.

10. Non-transitory computer program element characterized by being adapted, when in use on a general purpose computer, to cause the non-transitory computer to perform the steps of the method according to claim 1.

11. Non-transitory computer readable medium on which a non-transitory computer program element according to claim 10 is stored.

12. Closed loop production control unit for iteratively controlling a production process of at least one of a material and a product formed out of the material, the production control unit comprising:
   a calculating unit;
   an input interface; and
   at least two different simulation units;
   wherein the input interface is adapted for receiving at least one nominal parameter for each of the groups consisting of process parameters, material recipe parameters and product property parameters;
   wherein the input interface is further adapted for receiving at least one indicating parameter for each of the groups consisting of process parameters, material recipe parameters and product property parameters in a first production cycle;
   wherein the calculating unit is adapted for calculating at least one correcting parameter for a subsequent process cycle based on comparing the nominal production process parameters, the nominal material recipe parameters, the nominal product property parameters and the indicating production process parameters, the indicating material recipe parameters and the indicating product property parameters wherein the at least one correcting parameter consists of process parameters and material recipe parameters; and wherein the at least two different simulation units determine the efficiency of possible correcting parameters and/or the effects of possible correcting parameters for each of the groups of correcting parameters consisting of production process parameters and material recipe parameters.

13. Production control unit according to claim 12, further comprising:

(a) an output interface;

wherein the output interface is adapted for initiating a control of a production device on basis of the at least one correcting parameter; and/or (b) at least one measuring device for analyzing at least one of the material and the product with respect to the at least one nominal parameter.

14. Production control unit according to claim 13, wherein the measuring device is selected from the group comprising optical measuring device, density and mass measuring device, mechanical measuring device, magnetic measuring device, temperature measuring device, electrical measuring device, color measuring device, a device measuring the product surface and any sensor being able to measure properties of the product or of the material.

15. Production control unit according to claim 12, further comprising:

(a) a remote control device;

wherein a user is enabled by the remote control device to operate the production control unit from any remote position; and/or (b) at least two different databases storing data of at least one of different production processes and different raw materials for the production process;

wherein each database is connected with the production control unit;

wherein the production control unit is usable by different users via connections for different production processes.

16. Production device for iteratively controlled production of at least one of a compound material and a product formed out of the compound material, the production device comprising:

a production control unit according to claim 12.

17. Production device according to claim 16, further comprising:

a material control unit; and a process control unit;

wherein the material control unit is adapted for controlling a choice of raw material constituents and a proportion of the constituents in combination with the production control unit; and wherein the process control unit is adapted for controlling process parameters in combination with the production control unit.

18. Use of the production control unit according to claim 12 for converting materials into a plastic material forming a product.

* * * * *